United States Patent [19]
Tylisz et al.

[11] Patent Number: 5,017,066
[45] Date of Patent: May 21, 1991

[54] WELL CAR ADJUSTABLE GUIDE APPARATUS

[75] Inventors: Eugene R. Tylisz, Michigan City, Ind.; Bradford Johnstone, Flossmoor, Ill.

[73] Assignee: Trinity Industries, Inc., Dallas, Tex.

[21] Appl. No.: 460,576

[22] Filed: Jan. 3, 1990

[51] Int. Cl.$^5$ .............................. B60P 7/135
[52] U.S. Cl. .................. 410/121; 105/355; 410/94
[58] Field of Search ............. 410/88, 94, 122, 123, 410/121, 127, 128, 129, 153; 105/355

[56] References Cited

U.S. PATENT DOCUMENTS

| | | | |
|---|---|---|---|
| 1,085,285 | 1/1914 | Monesmith | 410/122 |
| 1,408,413 | 2/1922 | Smith | 410/81 |
| 2,764,105 | 10/1956 | Stiegel | 410/121 |
| 3,163,130 | 12/1964 | Lundvall | 410/127 |
| 3,200,772 | 8/1965 | Moorhead | 410/127 |
| 3,554,134 | 1/1971 | Brown | 410/88 |
| 3,606,842 | 9/1971 | Verbick | 410/94 |
| 4,052,083 | 10/1977 | Lutz | 410/122 |
| 4,091,742 | 5/1978 | Cordani | 410/94 |
| 4,456,413 | 6/1984 | Pavlick | 410/65 X |
| 4,754,709 | 7/1988 | Gramse et al. | 410/54 X |

*Primary Examiner*—Robert J. Spar
*Assistant Examiner*—Craig Slavin
*Attorney, Agent, or Firm*—Myers & Assoc., Ltd.

[57] ABSTRACT

An adjustable guide for a railway well car has a fixed guide for centering containers of a wide standard width during loading, and a retractable guide associated with and placed below the fixed guide for centering and positioning of containers of a narrower standard width. The positioning of the guides one below the other provides a stepped guide arrangement for incrementally guiding the container as it enters the well of the car.

20 Claims, 3 Drawing Sheets

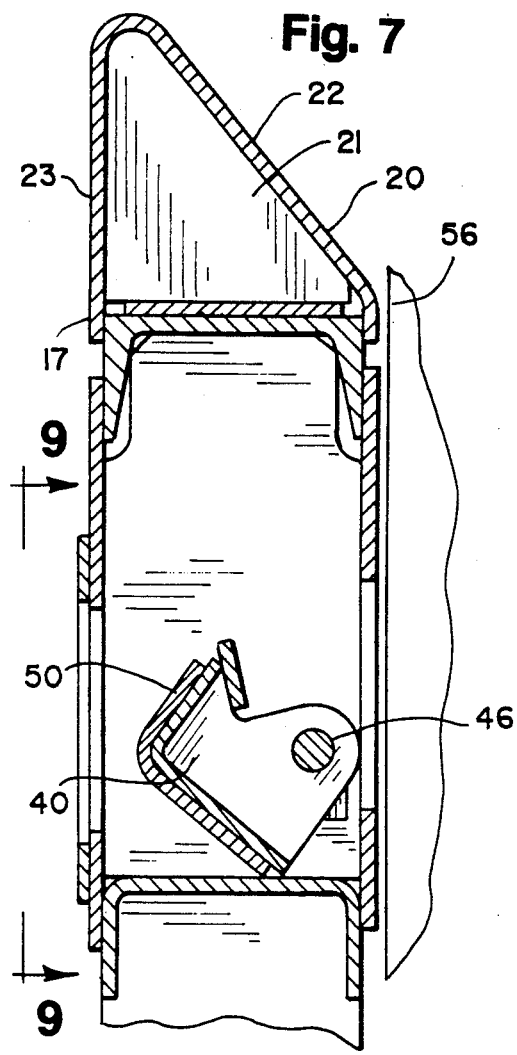
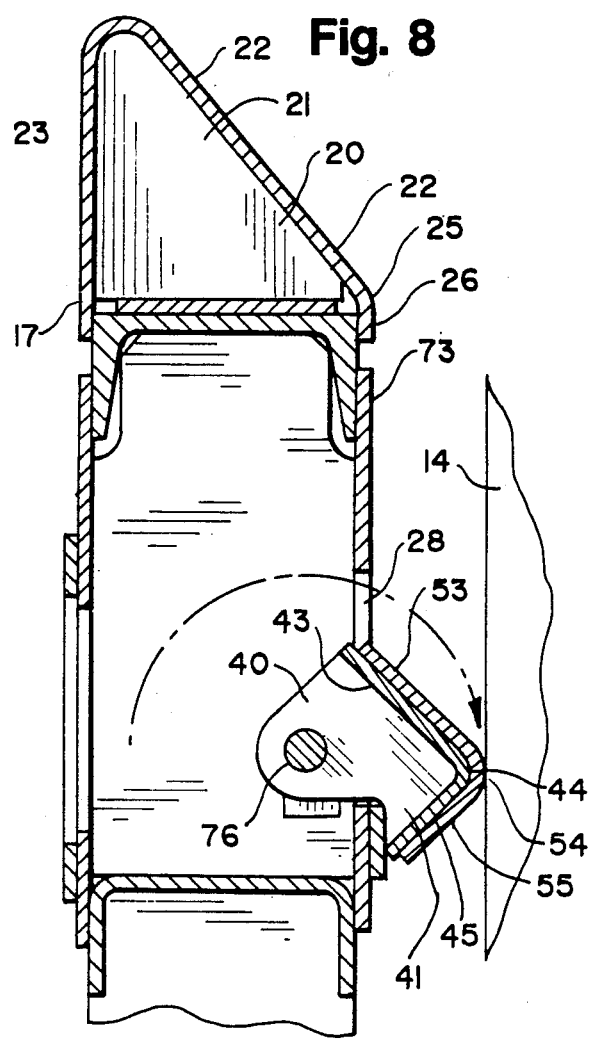
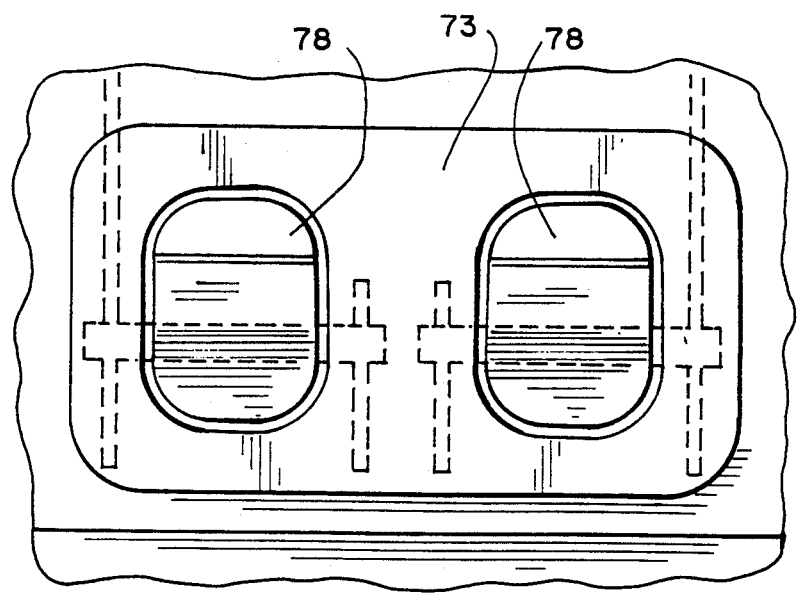

WELL CAR ADJUSTABLE GUIDE APPARATUS

BACKGROUND OF THE INVENTION

1. FIELD OF THE INVENTION

This invention relates to Railway Well Cars for carrying Cargo Containers of various lengths and widths using a pivoting adjustable shoe to maintain the container in lateral orientation.

2. DESCRIPTION OF THE PRIOR ART

U.S. Pat. No. 4,754,709 issued to Gramse July 5, 1988 shows a top guide on a well car spaced substantially above the car side wall and having a retractable guide which retracts into the top guide. The placement of the guides makes them vulnerable to damage from the container banging thereagainst during lifting, lowering and positioning operations. Gramse specifically calls for co-planar guide surfaces during deployment of the adjustable shoe. The instant invention specifically encompasses non-coplanar surfaces and an intermediate step.

Smith, U.S. Pat No. 1,408,413 uses a specialized longitudinal and laterally stopping casting, mating an angled portion with a specialized casting on a container and locking the two elements together with a lateral pin. Smith's stop is mounted on two pins which slide in a track permitting retraction to a horizontal position.

Other structures for laterally positioning cargo in vehicles address themselves to positioning cargo within an enclosed vehicle rather than positioning a cargo container on a railroad car. These include various arrangements of levers and bearing surfaces, such as Moorhead, U.S. Pat. No. 3,200,772 which shows scissors mechanisms, Verbick, U.S. Pat. No. 3,606,842 shows crankshafts, Lundvall, U.S. Pat. No. 3,163,130 shows pivoting arms and bearing surfaces in Lutz, U.S. Pat. No. 4,052,083.

Longitudinal road retaining devices adapted for placement within an enclosed vehicle such as a railroad car include longitudinally ratcheting vertically extending arms, in Stiegel, U.S. Pat. No. 2,764,105 and spring loader panels, are shown in Monesmith, U.S. Pat. No. 1,085,285. Brown, U.S. Pat. No. 3,554,134 uses a pedestal to support containers which pedestal pivots on a lateral axis to absorb fore and aft and vertical shock but does not provide any lateral positioning.

SUMMARY OF THE INVENTION

A Railway Well Car for carrying Cargo Containers has adjustable shoes for providing lateral positioning of cargo containers of varying width by providing retractable guide or shoe assemblies rotating about a longitudinal pivot within the side wall of the car. A fixed guide is mounted on top of the side wall, specifically on the chord surface. The guide shoe has a top angled portion for guiding the container into the well, the angled portion merging into a radiused portion or edge which in turn merges into short vertical portion aligned with a retraction housing plate on the interior side wall, the wall in part defining the container carrying well.

A retraction housing is mounted in the side wall structure. The retraction housing includes a plate affixed to the interior side wall, which abuts the corner castings of wide standard cargo containers. The retractable shoe is mounted in the housing on a longitudinal pin. The pin provides a pivot and is supported on transverse plates providing both structural support and reinforcement to the side wall and retraction housing assembly.

The adjustable guide or apparatus includes specific geometry for guiding and maintaining container position, and providing for ease of retraction, extension and positioning of the retractable stop itself. The geometry is described with reference to the extended guide or shoe for operation with narrow width cargo containers, it being understood that the relation between the elements is maintained while in a rotated, retracted condition.

A guide surface slopes downwardly and inwardly toward the center longitudinal axis of the car, permitting a container to slide thereon as it is lowered into the well car, to a desired position. This guide surface merges into a radiused portion or nose which contacts the container corner casting to maintain the lateral position of a narrow (8') standardized container in the car during transport. The radiused portion then merges into a bottom angled portion which extends downwardly and outwardly from the center axis of the car and from the container to a point where a stop portion abuts the plate and holds it in a selected position. The radiused portion or nose of the retractable shoe or stop in the extended position abuts the corner casting of a narrow width cargo container.

A single retractable shoe in a retraction housing is placed adjacent to each of the four corners of the well. Twin or double retractable shoes are placed in a retraction housing located midway along the length of each side wall to enable carrying varied width containers in tandem.

The stepped guide arrangement whereby a container being lowered contacts includes an inclined then a vertical and finally a second inclined surface. The inclined surfaces provide centering of the container by displacing it inwardly. The container is typically lowered by a crane forming a pendulum like arrangement.

The greater the lateral component at any given point, the greater the lateral load on the crane. The stepped vertical wall interrupts the lateral movement at any given guide permitting equalization of the forces by repositioning the crane. Four corner alignment of the entire container prior to the load being imposed on the retractable guide is also accomplished. In this regard it will be noted that a variety of container-car misalignment may occur during loading, about three axes including longitudinal and horizontal tilt and yaw around the vertical axis. The stepped vertical alignment wall provides for an intermediate, relatively high strength positioning point at a given corner helping reduce overall stresses as the container is lowered into the well.

Another added benefit from the separation of the fixed and retractable guides compared to alternatives where they are mounted together is that the strength of the fixed guide may be enhanced and the vulnerability of the retractable guide to impact damage may be reduced. The fixed guide is not weakened by apertures and may be made shorter than a similar guide which also houses a retractable guide and the appurtenant mechanism.

BRIEF DESCRIPTION OF THE DRAWINGS

FIG. 7 is an sectional view of the adjustable guide in the retracted condition.

FIG. 8 is a partial elevational view of the adjustable guide in the retracted condition.

FIG. 9 is an expanded, a partially cut away view of the double adjustable guide assembly.

DETAILED DESCRIPTION OF THE PREFERRED EMBODIMENT

Figure 1:
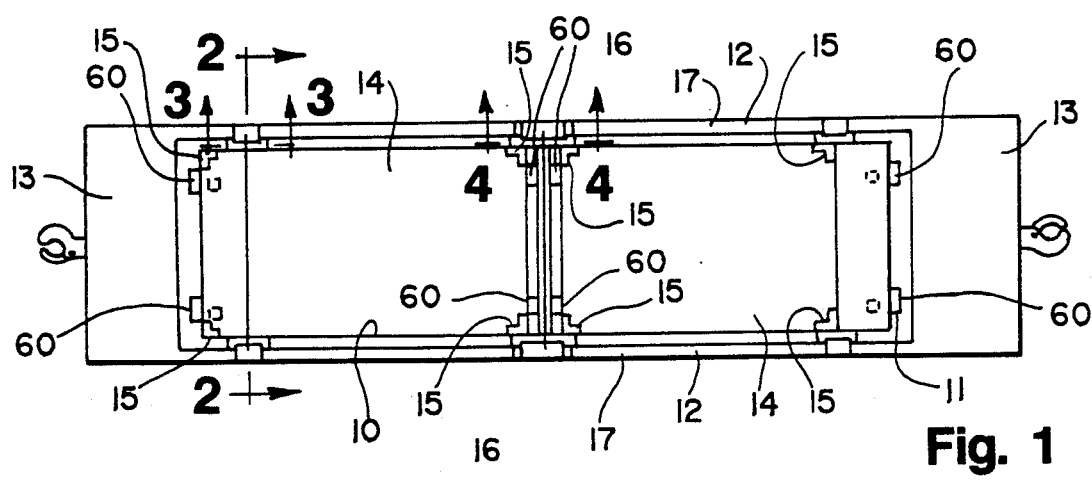
FIG. 1 is a top plan view showing a container carrying railway car platform.

FIG. 1 shows a well car (10) having a well (11) defined by side wall assemblies (12) and end portions of the car (13). Adjustable guide or blocking assemblies (16) are mounted on the top chord (17) of the side wall structure (12). The adjustable guides or blocks are aligned centrally with respect to the length of the car, so as to be aligned with each of the four corners (15) of a standard length container, with the double retractable stop embodiment more fully described hereinafter aligned with the additional corners of two standard short (20 foot) length shipping containers (14) placed in the well in tandem. Longitudinal movement of the containers are limited by the use of base fittings (60) which engage the bottoms of the corners (15) of the container.

Figure 2:
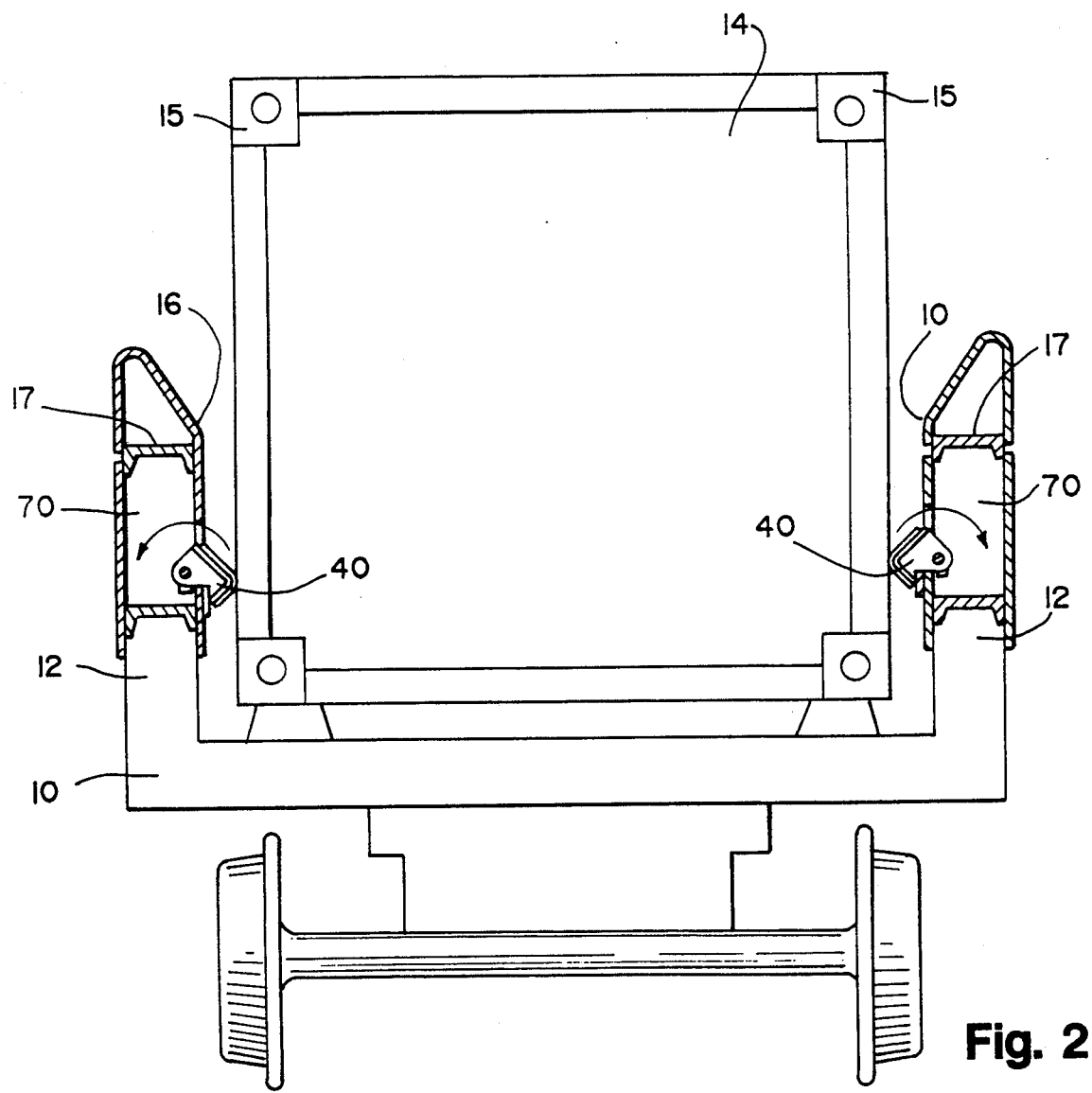
FIG. 2 is an sectional view of the end of a railway car with a container in place.

FIG. 2 shows the well car (10) with side wall assemblies (12) and side wall top chords (17) supporting the adjustable guide or block assemblies (16). The container (14) includes corner castings (15). In this view the narrow width of the container (14) requires extension of the two opposite retractable guides or blocks (40) from the retraction housing (70) to engage the corner (15) of the container. It will be understood that on containers of greater length the contact between the adjustable guide assembly (16) and the container (14) may be along the container side walls rather than the corner itself, however the bearing on either container side wall or corner suffices to provide the limit to lateral movement which is an object of this invention.

Figure 3:
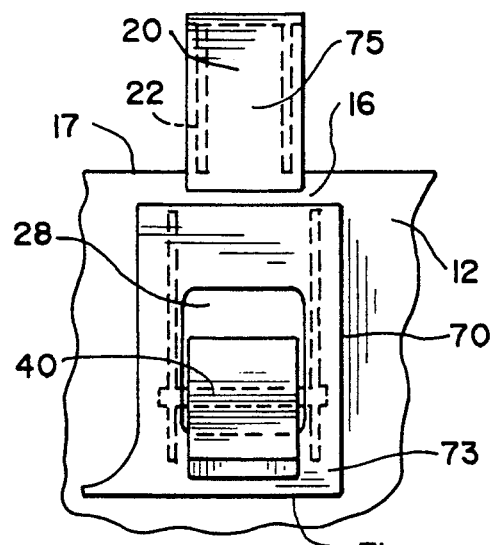
FIG. 3 is a partially cut away elevational view of a single adjustable guide assembly.

FIG. 3 shows the adjustable guide assembly (16) on the well car with the retractable stop (40) in the extended position. The retraction housing (70) is generally indicated. This view shows a single adjustable guide retraction housing (71).

The retractable guide (40) in its extended position extends through the retraction opening (28). A plate (73) provides structural reinforcing of the interior portion of the side wall structure (12) and provides the structure on which additional components operatively required for the retractable housing may be affixed. The plate (73) further provides the bearing surface on the interior of the well for wide containers when the retractable stop is in the retracted position.

The fixed guide (20) is generally indicated and located on the top chord (17) of the side wall assembly (12) of the well car. In the single retractable guide arrangement a relatively narrow width top element or fixed guide (75) is shown, as compared to FIG. 4. As shown in other figures, the sectional configuration of each fixed guide (20) is the same whether in a single or double arrangement. The width in this view (corresponding to length in the car generally) of the top element (75) is approximately the same as the width in the retractable guide (40). A wider, and structurally stronger top element could be used for improved guiding, larger bearing surfaces and increased strength, or a slightly narrower, lighter version without departing from the invention. The inboard reinforcing plate is visible in phantom behind the guide surface plate (22).

The respective guides or blocks and the intermediate bearing surface or plate therefore perform combinations of the two functions of guiding and positioning depending on the state of guide or block deployment, container size and stage of loading of the container.

Figure 4:
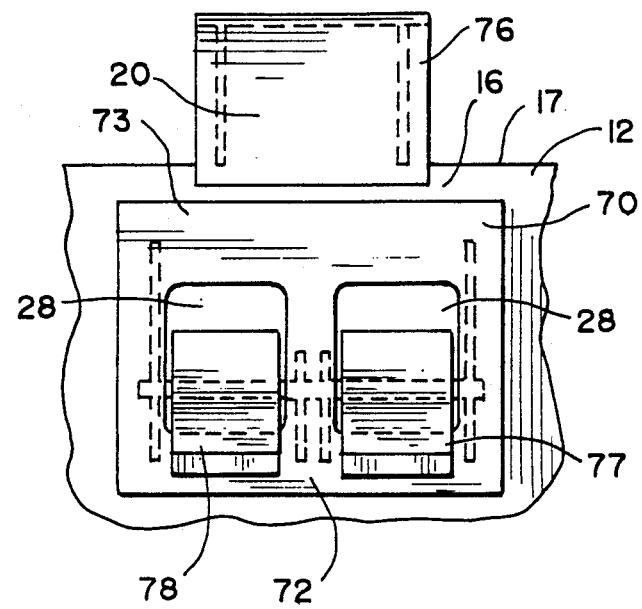
FIG. 4 is a partially out awaY elevational view of a double adjustable guide assembly.

FIG. 4 shows the adjustable guide assembly (16) on the well car with the double retractable guides or blocks (77 and 78) in the extended position. The retraction housing (70) is generally indicated. This view shows a double adjustable guide retraction housing (72). Each retractable guide is independently retractable and extendable.

The two retractable stops (77 and 78) are shown deployed through two corresponding retraction openings (28). As previously described, plate (73) provides structural reinforcing, structure on which additional components may be affixed and the bearing surface for wide containers.

The fixed stop (20) is generally indicated and located on the top chord (17) of the side wall assembly (12). In the double retractable stop a relatively wide top element (76) is shown, as compared to FIG. 3. The width in this view of the top element (76) is approximately the same as the span of the two retractable stops. A wider, and structurally stronger top element could be used for improved guiding, greater bearing surfaces and increased strength, or a slightly narrower, lighter version, without departing from the invention, so long as the width is sufficient to abut corners of two tandem containers as they are lowered into the well.

Figure 5:
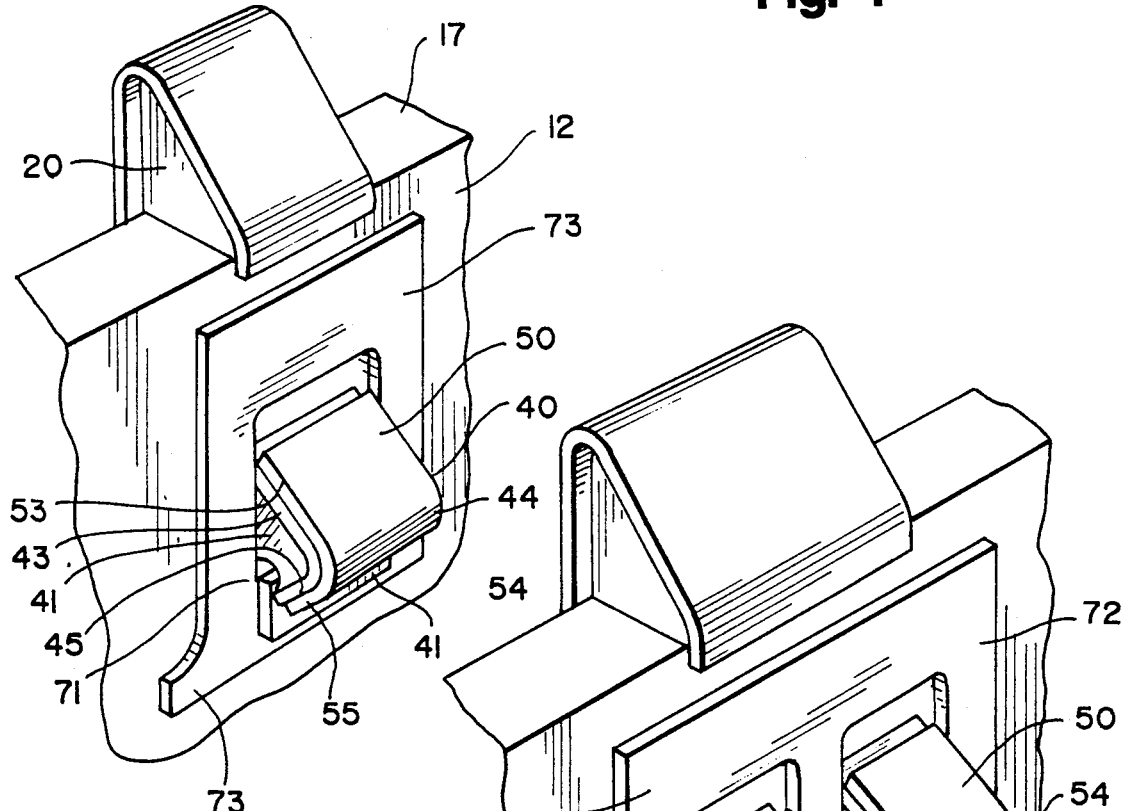
FIG. 5 is a perspective view of a single adjustable guide assembly.

FIG. 5 is a perspective view of the single retractable guide embodiment. Visible are the single retractable guide housing (71) with the plate (73) on the car side wall (12). The retractable guide (40) is extended. The top guide (20) is mounted on and extends above the chord (17).

The retractable stop upper (43) and lower (45) angled faces support an optional shim (50). The shim (50) may be attached to the retractable guide (40) by welding or other suitable method of affixation to the angled faces (43 and 45) and the corresponding shim upper (53), and lower (55) angled faces.

The use of the respective angled faces provides increased adaptability of shim and guide to various fabrication and field needs including adjusting tolerance between opposed guide assemblies on the car during manufacture and for adjusting clearance between guide or shoe assemblies and container walls as wear members or as replacement members to compensate for wear. The use of substantially normal angles permits greater ease of application of the shim with greater strength as compared to the application of flat shims to flat plates.

The edge of the lower face (45) and a portion of the wall of the retractable guide stop plate (41) abuts plate (73) which maintains the guide in the appropriate position when extended. The bearing or stop plate thickness provides for a complementary additional positioning means for the apical o curved portion (44) of the retractable stop (40) or corresponding apical or curved nose portion (54) of the optional shim which may be placed thereon.

Figure 6:
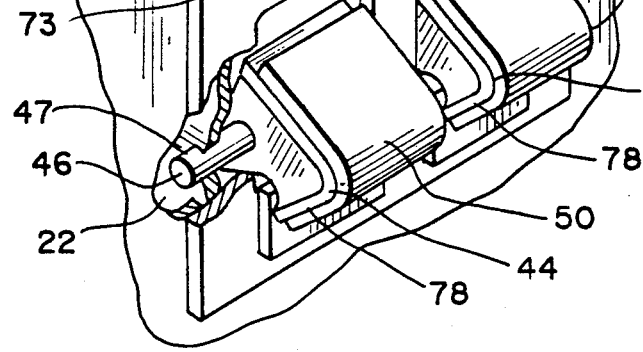
FIG. 6 is a perspective view of a double adjustable guide assembly.

FIG. 6 is a perspective view of the double guide configuration assembly. Shown in cutaway is a shaft 46 carried in an opening or bushing 47 in a side panel or member. A single shaft may be used for both retractable guides (78) or independent shafts.

The use of a pair of retractable guides (78) permits independent retraction into the double guide housing (72). This feature permits use with tandem-carried containers of both narrow (8 foot) and wide (8 foot 6 inch) configuration by retraction of the guide (78) for the wide container, the wall of which then abuts plate (73). The extended guide (78) apical portion (44) or shim portion corresponding thereto (54) abuts the wall of a narrow container.

FIG. 7 shows one of the retractable guide assemblies in section wherein the retractable guide stop (40) is in the retracted position. The retractable stop carried on the pivot shaft or pin (46) rotates through more than approximately 180 degrees from the extended position to the position shown where it is maintained retracted by gravity. The elements may be arranged for more than 180 degrees travel for an over-center condition to better maintain the retracted position without latches or stops. Since the retractable guide is completely retracted, the container wall (56) bears directlY on the plate (73). Shims (50) permit adjustment to relatively close tolerances and maintenance of desired clearances despite wear in the field.

The fixed guide (20) has a structure reinforcing plate (21) supporting guide surface (22) and forming a unitary structure of generally triangular form with exterior wall (23) and top chord (17). This form of structure has greater strength and reduced exposure that prior art structure of traperzoidal form.

FIG. 8 shows a sectional view of the fixed guide (20) on the chord (17), the stepped lip (25) forming a face (26) with plate (73) oriented substantially vertically.

The retractable guide itself includes a pair of support plates (41) which support a plate formed to include upper angled (43), curved (44) and lower angled (45) portions. The retractable guide rotatably retracts and extends on the pivot pin (46) which extends through the respective support plates (41). The arc of extension of the nose or curved portion permits complete rotation of the retractable guide even when a cargo container (14) is in the well.

FIG. 9 is an enlarged view corresponding to FIG. 4 in which the retractable guide (78) are in the retracted position exposing the full surface of the plate (73).

In accordance with my invention, I claim:

1. In a railway car adapted for carrying cargo containers of first and second predetermined widths, said car having side and end walls defining a well of fixed width and length for accommodating either of said containers;
    guide means for maintaining the containers in a selected lateral position with respect to the vehicle, comprising;
    a fixed guide mounted on a side wall and projecting thereabove and having a surface overlapping the side wall and inclined downwardly toward the interior of the well and terminating in an end portion substantially flush with the interior of the car adjacent to the top of the side wall;
    a vertical bearing portion positioned against the interior of the side wall and extending downwardly from adjacent said end portion below said fixed guide, said vertical portion adapted to contact the wall of a container of said first predetermined width after it slides off said surface of said fixed guide into the well;
    a guide housing in the side wall outboard of the well being located below the bearing portion and the upper edge of the side wall;
    a retractable guide mounted in the housing entirely below said fixed guide and separated therefrom and having a container contact portion swingable in an arc tangential to a side of a container of narrow width placed in the well to facilitate retraction and extension of the retractable guide while the narrow width container is in the well, said housing being entirely within the respective side wall in shielding relation to the retractable guide when positioned in the housing.

2. The invention according to claim 1 and
    longitudinally axial pivot means for pivoting said retractable guide, the entire retractable guide swingable within an arc of a diameter less than the crest of movement of the container contact portion;
    said retractable guide having a center of mass; and
    said center of mass being lower than the pivot axis in both the retracted and extended positions of the retractable guide for maintaining said retractable guide in said positions by gravity.

3. The invention according to claim 2 and
    said retractable guide being generally angularly shaped with the apex of the angle at the container contact portion;
    a generally angularly shaped shim cap-mounted o said retractable guide for positioning between said guide and said container.

4. The invention according to claim 3 and
    said car including three guide means on each side wall opposed to each other, two of the three guide means being associated with two corners of the car and one being centrally disposed therebetween;
    said two guide means having a single retractable guide associated therewith, and;

5. A unitary guide for a railway car for carrying containers of different widths, said car having a side wall,
    said guide having an upper portion overlying an upper edge of the side wall;
    a vertical intermediate guiding portion lying against the interior of the side wall; and
    a lower guiding portion pocketed in said side wall and optionally extensible from the side wall, said upper and lower portions providing guide surfaces vertically stepped in relation to one another in the extended position of the lower portion and said lower portion being entirely separate from the upper portion and in vertical alignment therewith.

6. A guide assembly according to claim 5 wherein said lower portion comprises a rigid element; and
    a pivot mounting said lower portion form the side wall for said extension from the side wall, said lower portion being cupped within the side wall.

7. The invention according to claim 6 and
    said lower portion being configured to accommodate its placement against the narrower of said containers and swingable away from said narrower container to stowed position not withstanding said narrow container being within the car.

8. The invention according to claim 7 and
    said rigid element comprising an apical end; and said pivot mounting said lower portion to accommodate its placement between the vertical portion and an opposing side of the narrower container and removal of said lower portion from the space between said first portion and the narrower container whilst the latter is in place on the car.

9. The invention according to claim 8 and
said pivot mounting said lower portion for swinging about a horizontal axis, toward and away from the adjacent container.

10. The invention according to claim 9 and
said car having a plurality of said guides arranged for the simultaneous carriage of end to end positioned containers of different widths, by incorporating an opposed pair of guides each of which has two independently operative lower portions.

11. A two tiered guide assembly for guiding a container into a well of a railway car having side walls with upper edge portions and vertical inner faces,
each said assembly having a fixed upper portion positionable extending above the upper edges of the respective side walls and providing an upper guide surface sloping toward the well and terminating in an inner edge adjacent to said inner face,
said assembly having a movable portion spaced below said fixed portion;
guide means comprising a vertical surface separating said movable portion from said fixed portion and disposed in vertical alignment with said inner edge and extending to said movable portion; and
said movable portion in deployed position providing a guide surface sloping toward the well stepped downwardly from said upper guide surface and protruding entirely into the well below said upper edge of the associated side wall.

12. The invention according to claim 11, and
said movable portion extendable into the car for engaging the side of a narrow container.

13. The invention according to claim 12, and
said assembly comprising a bracket attachable to said side wall and positioning said upper portion above the upper edge of the side wall and disposing said movable portion below said upper edge.

14. The invention according to claim 13, and
said side wall having a pocket below its upper edge for storing said movable portion.

15. The invention according to claim 14, and
said movable portion being pivotal on a horizontal axis parallel with said side wall.

16. A railway well car defined by side walls and end portions disposed to accept containers of first and second widths comprising;
static guide means for guiding containers of both widths into the well mounted on and extending above the side wall;
said static guide means having an exterior edge and having an interior edge below the exterior edge;
retractable guide means of guiding and positioning a container of said second width pivotally mounted and entirely retractable into said side wall and extendable into said well for guiding and positioning a second width container deposited into the well;
bearing means for guiding a container of said first and second widths and positioning containers of said first width in the well, said bearing means operatively connecting said static and retractable guide means;
said bearing means having a top portion adjacent said static guide means interior edge;
said static guide means, bearing means and retractable guide means forming a continuous vertically stepped guide arrangement.

17. The invention according to claim 16, and
said side wall having a top surface;
said static guide means mounted on said top surface comprising a sloped guide member slanting downwardly and inwardly from said exterior edge to said interior edge, an exterior support element extending vertically from said top surface to said exterior edge;
said top surface, sloped guide member and exterior support element defining a substantially triangular section.

18. The invention according to claim 17, and
said retractable guide means further comprising:
a longitudinal pivot member;
said retractable guide means having a guide surface with a terminus;
a container positioning abutment at the terminus of said guide surface for maintaining a container in position when the guide member is extended.

19. The invention according to claim 18, and
said well car further comprising:
a plurality of said stepped guide arrangements spaced along said walls for simultaneous positioning of containers of both of said first and second width, or either of them, said stepped guide arrangements being spaced with two on each side wall means each end portion and a stepped guide arrangement spaced on each sidewall therebetween defining thereby a series of opposed pairs of stepped guide arrangements.

20. The invention according to claim 19, and
a shim adapted for capping said retractable guide member, a guiding member on said shim and a nose portion on said shim;
said shim having said guiding member aligned with said guide surface and said nose portion aligned with said abutment for adjustment of clearance between opposed pairs of stepped guide arrangement.

* * * * *